(12) United States Patent
Heckenberger et al.

(10) Patent No.: US 9,283,826 B2
(45) Date of Patent: Mar. 15, 2016

(54) DEVICE FOR COOLING A HEAT SOURCE OF A MOTOR VEHICLE

(75) Inventors: Thomas Heckenberger, Lienfelden-Echterdingen (DE); Conrad Pfender, Besigheim (DE); Dirk Neumeister, Stuttgart (DE); Guenther Feuerecker, Suttgart (DE); Manuel Wehowski, Stuttgart (DE); Roland Burk, Stuttgart (DE); Hans-Georg Herrmann, Hans-Georg (DE); Tobias Isermeyer, Stuttgart (DE); Florian Moldovan, Stuttgart (DE); Martin Steinbach, Waiblingen (DE)

(73) Assignee: MAHLE International GmbH, Stuttgart (DE)

( * ) Notice: Subject to any disclaimer, the term of this patent is extended or adjusted under 35 U.S.C. 154(b) by 1000 days.

(21) Appl. No.: 12/741,793

(22) PCT Filed: Nov. 13, 2008

(86) PCT No.: PCT/EP2008/009583
§ 371 (c)(1),
(2), (4) Date: Aug. 16, 2010

(87) PCT Pub. No.: WO2009/062710
PCT Pub. Date: May 22, 2009

(65) Prior Publication Data
US 2010/0307723 A1    Dec. 9, 2010

(30) Foreign Application Priority Data

Nov. 13, 2007 (DE) .......................... 10 2007 054 504
Feb. 8, 2008 (DE) .......................... 10 2008 008 353

(51) Int. Cl.
*F25B 41/00* (2006.01)
*B60H 1/00* (2006.01)
*B60H 1/14* (2006.01)
*H01M 10/625* (2014.01)
*H01M 10/615* (2014.01)
*H01M 10/663* (2014.01)
*H01M 10/6556* (2014.01)
*H01M 10/6568* (2014.01)
*H01M 10/6569* (2014.01)
*H01M 10/6551* (2014.01)
*H01M 10/6557* (2014.01)
*H01M 10/613* (2014.01)
*H01M 10/0525* (2010.01)
*H01M 10/647* (2014.01)
*H01M 10/6555* (2014.01)
*H01M 10/6566* (2014.01)

(52) U.S. Cl.
CPC ........ *B60H 1/00278* (2013.01); *B60H 1/00385* (2013.01); *B60H 1/143* (2013.01); *H01M 10/613* (2015.04); *H01M 10/615* (2015.04); *H01M 10/625* (2015.04); *H01M 10/6551* (2015.04); *H01M 10/6556* (2015.04); *H01M 10/6557* (2015.04); *H01M 10/6568* (2015.04); *H01M 10/6569* (2015.04); *H01M 10/663* (2015.04); *B60H 2001/003* (2013.01); *B60H 2001/00307* (2013.01); *H01M 10/0525* (2013.01); *H01M 10/647* (2015.04); *H01M 10/6555* (2015.04); *H01M 10/6566* (2015.04)

(58) Field of Classification Search
CPC .......... B60H 1/00278; B60H 1/00385; B60H 1/143; B60H 2001/00307; H01M 10/5004; H01M 10/5016; H01M 10/5046; H01M 10/5095; H01M 10/6555; H01M 10/6566; H01M 10/613; H01M 10/6551; H01M 10/6557; H01M 10/6568; H01M 10/6569; H01M 10/647; H01M 10/6556; H01M 10/0525; H01M 10/625; H01M 10/615; H01M 10/663
USPC .......... 62/513, 498, 239, 243, 244, 505, 502, 62/436, 120, 259.2; 165/42, 202, 10, 165/104.33
See application file for complete search history.

(56) References Cited

U.S. PATENT DOCUMENTS

| | | | |
|---|---|---|---|
| 4,007,315 A * | 2/1977 | Brinkmann et al. | 429/62 |
| 4,468,440 A * | 8/1984 | Evjen | 429/8 |
| 5,215,834 A * | 6/1993 | Reher et al. | 429/62 |
| 5,291,960 A * | 3/1994 | Brandenburg et al. | 180/65.27 |
| 5,871,041 A * | 2/1999 | Rafalovich et al. | 165/10 |
| 6,182,742 B1 * | 2/2001 | Takahashi et al. | 165/104.33 |
| 6,481,230 B2 * | 11/2002 | Kimishima et al. | 62/239 |
| 6,705,101 B2 | 3/2004 | Brotz et al. | |
| 7,013,659 B2 * | 3/2006 | Yoshida et al. | 62/186 |
| 7,063,137 B2 * | 6/2006 | Kadle et al. | 165/202 |
| 2005/0167169 A1 | 8/2005 | Gering et al. | |
| 2006/0060340 A1 | 3/2006 | Busse et al. | |
| 2006/0169507 A1 | 8/2006 | Inoue et al. | |
| 2007/0089442 A1 | 4/2007 | Tsuchiya | |
| 2008/0276913 A1 * | 11/2008 | Zubeck | 123/543 |
| 2009/0024256 A1 * | 1/2009 | Adams et al. | 700/300 |
| 2010/0316899 A1 * | 12/2010 | Yang | 429/120 |

FOREIGN PATENT DOCUMENTS

| | | |
|---|---|---|
| DE | 4408960 | 4/1995 |
| DE | 19542125 | 5/1996 |
| DE | 10128164 | 12/2002 |
| DE | 112005000060 | 9/2006 |
| DE | 102005048241 | 4/2007 |
| EP | 1264715 | 12/2002 |
| EP | 1637709 | 3/2006 |
| FR | 2778271 A1 | 11/1999 |
| FR | 2865070 A1 | 7/2005 |
| WO | 2005/092650 | 10/2005 |

OTHER PUBLICATIONS

European Search Report for Application No. 10186554.1 dated Mar. 4, 2011.
European Search Report for Application No. 10186542.6 dated Mar. 4, 2011.

* cited by examiner

*Primary Examiner* — Marc Norman
*Assistant Examiner* — Ana Vazquez
(74) *Attorney, Agent, or Firm* — Bachman & LaPointe, PC

(57) ABSTRACT

A device for cooling a heat source of a motor vehicle, including a cooling body (7) which is in thermal contact with the heat source, a first fluid stream for the discharge of heat being capable of flowing to the cooling body (7), wherein at least one second fluid stream for the discharge of heat can flow selectably to the cooling body (7).

19 Claims, 9 Drawing Sheets

DEVICE FOR COOLING A HEAT SOURCE OF A MOTOR VEHICLE

BACKGROUND OF THE INVENTION

The invention relates to a device for cooling a heat source of a motor vehicle.

EP 1 264 715 B1 describes a cooling system for cooling a temperature-increasing unit, such as, for example, a driving battery, in which the heat of the battery can be discharged by means of a coolant circuit and can be supplied to the refrigerating circuit of an air conditioning system of the vehicle. To ensure a sufficient discharge of heat from the driving battery, the refrigerating circuit therefore has to be in operation.

SUMMARY OF THE INVENTION

The object of the invention is to specify a device for cooling a heat source of a motor vehicle, the operation of which device can be adapted to changing ambient conditions in a simple way and with high energy efficiency.

The object is achieved according to the invention, for a device initially mentioned, by means of the following disclosure. By the selective flow of a first or a second fluid stream, a sufficient cooling can be achieved, particularly with the ambient conditions being utilized optimally. For example, in a first operating mode, the heat pumping of a refrigerating circuit, when operating as a compressor, of a vehicle air conditioning system can thus be utilized, and in a second operating mode sufficient cooling by the other fluid stream can be ensured even when the compressor of the refrigerating circuit is not being operated, for example in winter. As well as such an optimization of the overall system with regard to the ambient conditions, the increased operating reliability can also be achieved, so that, even in the event of a failure of the compressor of the refrigerating circuit, cooling power can still be achieved by means of one of the selectable fluid streams.

In a preferred embodiment, the heat source is an electrical energy accumulator, in particular a lithium ion battery. Such an energy accumulator may be a driving battery of the vehicle which, for example, may be designed as a hybrid vehicle or else as a straightforward electric vehicle. Modern driving batteries in particular, above all lithium ion batteries here, require, for reasons of high power density, operating reliability and the optimization of service life, a cooling system which is adapted optimally under all conditions and which ensures suitable operating temperatures of the driving battery.

In a preferred embodiment of the invention, the fluid of the first fluid stream is identical to the fluid of the second fluid stream. Preferably, in this case, the fluid is a refrigerant, the first fluid stream being driven by a compressor of a refrigerating circuit, in particular of an air conditioning system, and the second fluid stream being driven by a circulating pump. Operating the compressor of a refrigerating circuit demands a high drive power, operation at low temperatures for air conditioning purposes being required at most to a limited extent, for example for air dehumidification. Furthermore, at even lower temperatures, it is not possible to operate the air conditioning system. If the compressor is shut down under such conditions, a branch of the refrigerating circuit can function, by means of the circulating pump provided, as an alternative fluid stream in the context of the invention and in the manner of a simple cooling circuit can transport heat away from the heat source with or without an appreciable utilization of the phase transformation of the refrigerant. In such an embodiment, generally, either the first fluid stream can be selected as a refrigerant stream during compressor operation or, alternatively, the second fluid stream can be selected as the refrigerant stream during circulation operation. In this case, in a simple and expedient detailed configuration, each of the two alternative fluid streams can be cooled by means of a condenser of the refrigerating circuit.

Particularly preferably, in this case, the second fluid stream flows through a valve which follows the cooling body and which activates or deactivates the second fluid stream. Furthermore, as a throttle valve, it can set the pressure in the cooling body correspondingly, if the boiling of the refrigerant in the cooling body is undesirable.

In a first expedient detailed configuration of the invention, a first flow path for the first fluid stream and a second flow path for the second fluid stream are formed in the cooling body. At least for the case where the fluid is identical for both fluid streams, however, there may alternatively also be provision for both fluid streams to flow through the same flow path in the cooling body. In this case, the selection of the fluid stream expediently takes place via at least one switchable valve.

In order to bring the heat source to be cooled to a desired operating temperature quickly, for example during a cold start in winter, there is advantageously provision for at least one of the fluid streams to be capable of flowing to an, in particular, electrical heating element for the selectable heating of the heat source.

In a further preferred embodiment, there is provision for a fluid of the first fluid stream to be a refrigerant of a refrigerating circuit, in particular of an air conditioning system, and for the fluid of the second fluid stream to be a coolant, separate from the first fluid, of a coolant circuit. This likewise affords the possibility, even when the refrigerating circuit is switched off, of achieving a cooling of the heat source by means of the flow of the coolant of the cooling circuit. In such a variant, the fluid streams may be conducted both alternatively and cumulatively to the cooling body, an especially high cooling power being possible in the cumulative variant. In particular, such a cumulative flow of both fluid streams may be desirable in the case of high outside temperatures and/or a high output of the heat source. With regard to the fluid stream of the refrigerant, the cooling body is expediently designed in the manner of an evaporator with a preceding expansion member, so that an evaporation or phase transformation of the refrigerant takes place within the cooling body. Usually, where the coolant is concerned, evaporation will not occur, although this is not ruled out in the context of the invention.

In an expedient refinement, the coolant circuit comprises a circulating pump and a cooler for the discharge of heat from the fluid. The cooler may be provided, for example, as a low-temperature cooler in a vehicle front region subjected to a flow of relative wind.

In order to bring a driving battery to the desired operating temperature quickly, for example during a cold start in winter, there may be provision for the coolant circuit to have a heat exchanger for the selectable heating of the coolant upstream of the driving battery. In one possible detailed configuration, the additional heat exchanger can transmit heat from a braking action of the vehicle to the fluid. It may in this case be an induction brake, resistance heating or a friction brake.

Moreover, a further heat source for cooling may expediently be provided in the cooling circuit. This may be any suitable component of the vehicle, for example an electric motor or the power electronics.

In a preferred refinement, the cooling body can be separated selectably from the cooling circuit, in particular by means of a valve. This may be advantageous particularly when, in one operating mode, the cooling circuit is used for cooling other components and the heat source or driving battery is cooled by means of the fluid stream from the refrigerating circuit.

In a further embodiment of the invention, one of the fluid streams is an air stream. In an expedient detailed configuration, the air of the fluid stream is in this case, at least selectably, ambient air from outside the vehicle. This takes account of the fact that the ambient air is sufficiently cool, above all, when the air conditioning system of the vehicle is not switched on. Alternatively, however, the air may also be from inside the vehicle.

Preferably, the cooling body comprises cooling ribs around which the air is capable of flowing, in order to allow an optimal transfer of heat to the air stream.

In most general terms, to ensure that an operating temperature of the heat source, in particular of a driving battery, is reached quickly, there may be provision for an electrical heating element for the selectable heating of the heat source to be arranged on the cooling body. This may be a heating element which is in direct thermal contact or else a heating element for the flow of heated air to the cooling body.

In a further advantageous refinement of the invention, a fluid of the first fluid stream is a refrigerant of a refrigerating circuit, in particular of an air conditioning system, a throttle element being provided, downstream of the cooling body, in the refrigerating circuit.

This throttle element may be configured either as a fixed throttle or as an adjustable valve (for example, an electronic expansion valve) with a variable pressure loss. By means of the throttle element, an increase of the suction pressure in the cooling body conduit through which refrigerant flows is achieved, so that the evaporation temperature of the refrigerant is raised as a result of the increased pressure level.

The driving temperature gradient between the refrigerant and heat source is varied by a variation in the evaporation temperature, with the result that the heat flow discharged can be varied.

Correspondingly, with the aid of a variation in suction pressure, an adaption of the heat flow discharged to different operating situations can be carried out.

Figures 1, 2:
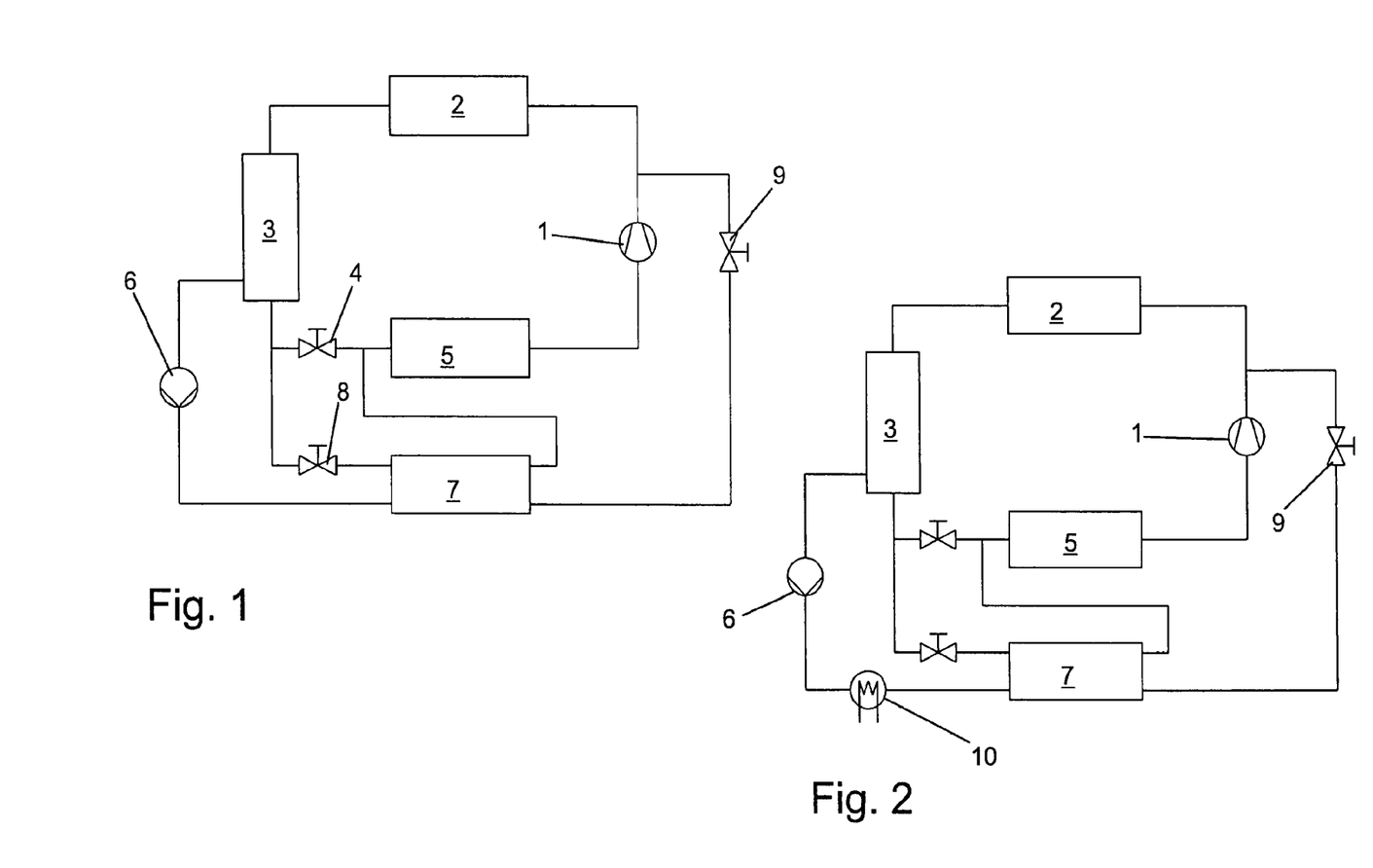
FIG. 1 shows a diagrammatic illustration of a first exemplary embodiment of the invention.
FIG. 2 shows a first modification of the exemplary embodiment from FIG. 1.

Insofar as a continuous operation of the cooling body is not desirable, in a further embodiment a clock valve or shut-off valve may be provided (schematically illustrated for example in FIG. 1 at reference numeral (8), upstream of the cooling body, in the refrigerating circuit. Such operation is desirable, for example, when continuous operation leads to too high a discharge of heat flow via the refrigerant, with the result that the heat source is brought to too low a temperature level. A low temperature level may be energy-inefficient and, in the case of a traction battery, may lead to lower efficiencies.

Further advantages and features of the invention may be gathered from the exemplary embodiments described below.

BRIEF DESCRIPTION OF THE DRAWINGS

Several preferred exemplary embodiments of the invention are described below and are explained in more detail by means of the accompanying drawings.

DETAILED DESCRIPTION

The illustration of the first exemplary embodiment according to FIG. 1 shows a refrigerating circuit of an air conditioning system of the motor vehicle, with a compressor 1, a following condenser 2, a collector 3, an expansion member 4 and an evaporator 5 for the cooling and dehumidification of air for the air conditioning of a passenger space. Moreover, downstream of the collector 3, a first flow path of the circuit branches off, in which a circulating pump 6 and a following cooling body 7 are arranged. On the outlet side of the cooling body 7, this flow path, after running through a throttle valve 9, issues, downstream of the compressor 1 and upstream of the condenser 2, into the refrigerating circuit again.

A further branch-off of the refrigerating circuit branches off downstream of the collector 3 and upstream of the expansion valve 4. This second flow path runs through a second expansion member 8 and thereafter through the cooling body 7, the ducts of the first flow path and of the second flow path running separately within the cooling body 7. The second flow path leads, on the outlet side of the cooling body 7, to an issue between the first expansion member 4 and the evaporator 5.

The cooling body 7 is connected in a structurally unitary manner thermally conductively to a heat source of the vehicle in the form of a driving battery. The driving battery is, for example, a lithium ion battery which transfers lost heat to the cooling body 7. In the specific exemplary embodiment, the vehicle is a hybrid vehicle with an internal combustion engine and an electric motor or a straightforward electric vehicle.

The invention, then, functions as follows:

In a first operating mode, the compressor 1 is deactivated and the circulating pump 6 is activated. The pump 6 sucks in liquid refrigerant from the collector 3 and conveys it through the first flow path of the cooling body 7 for the absorption and discharge of the heat of the driving battery. The valve 9 is set so that the refrigerant is present at the inlet of the cooling body as a liquid phase, at the same time not usually being subject to any phase transformation. In particular, the valve 9, as a throttle valve, may be set so that the refrigerant enters the following condenser as a gas/liquid mixture (wet steam). In the condenser, the absorbed heat is transferred to the ambient air and the refrigerant is cooled, so that it accumulates again in the liquid phase in the following collector 3. In this operating mode, the refrigerant which is not compressed, but only pumped, constitutes a first fluid stream for flowing to the cooling body 7 in the context of the invention.

This first operating mode makes it possible to cool the heat source via components of the vehicle air conditioning system when compressor operation is not required, is not effective or is not even possible for the air conditioning of the passenger space, for example in winter.

In a second operating mode, the compressor 1 is switched on and the valve 9 is closed or else the pump 6 is deactivated in a fluid-tight manner, so that the cooling body 7 is integrated in the manner of an evaporator into the refrigerating circuit. The shaping of the ducts in the cooling body, particularly with regard to the second flow path, is optimized in terms of the function as an evaporator. A distribution of the refrigerant stream to the cooling body 7 and to the evaporator 5 may take place by means of a setting of the expansion members 4, 8. In a modification, the outlet of the cooling body 7 may also issue downstream of the evaporator 5; basically, various interconnections of the cooling body 7 operated as an evaporator and of the evaporator 5 may be envisaged. In this second operating mode, the compressed refrigerant conveyed via the compressor 1 constitutes a second fluid stream for flowing to the cooling body in the context of the invention.

The cooling body 7 may be implemented in structural terms, for example, in that two or more cooling body plates are connected to one another in a sheet-like manner, the duct for the first flow path being arranged in one plate and the duct for the second flow path being arranged in a further plate, and similarly, if appropriate, further flow paths being arranged in further plates. The connection should be highly heat-conductive, preferably should be soldered. The prior art discloses many examples of lithium ion batteries being held on a fluid-throughflow cooling body in a manner effectively connected in thermal terms.

In another embodiment two or more fluid routing ducts may be arranged separately from one another in a cooling body plate.

In the modification illustrated in FIG. 2, in contrast to the first exemplary embodiment, an electrical heating source 10 is additionally arranged downstream of the circulating pump 6. An electrical heating source is advantageous especially when braking energy present in electrical form cannot be supplied to a cold battery and therefore cannot be made usable at least for heating. Particularly under winter operating conditions, in which the first flow path is operated especially expediently, a rapid heating of the driving battery to an operating temperature may be desirable during a cold start of the vehicle. As a result, a higher battery performance is made possible, and the service life of the battery can also be improved by a reduction in the warm-up phase.

Figure 3:
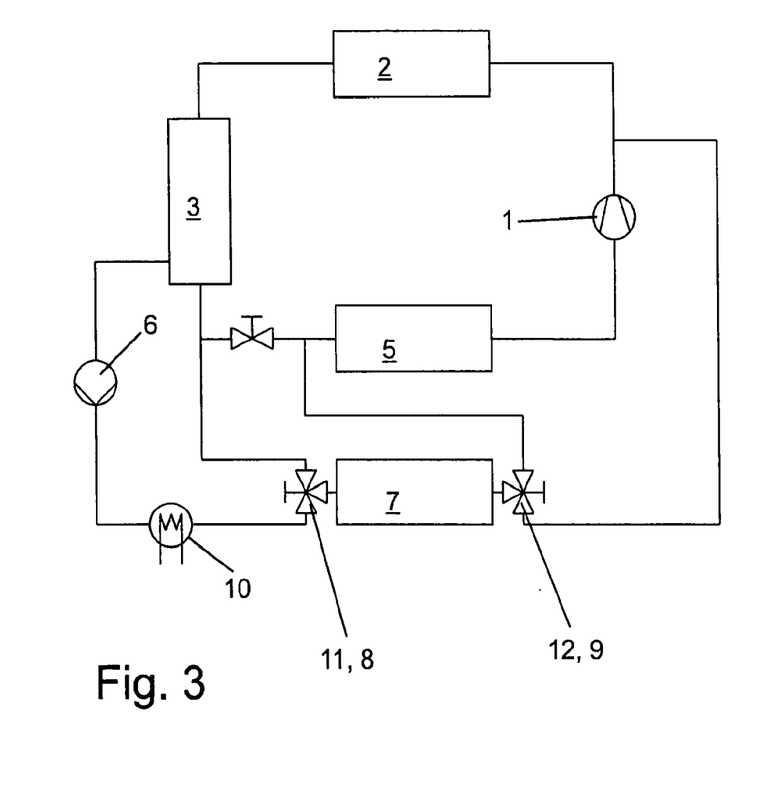
FIG. 3 shows a second modification of the exemplary embodiment from FIG. 1.

In the modification shown in FIG. 3, in contrast to the example according to FIG. 2, only a single duct for the throughflow of refrigerant is provided in the cooling body 7, and therefore the latter is simplified in structural terms. For selecting the first flow path or the second flow path, depending on the chosen operating mode, in each case valve arrangements 11, 12 in the manner of switchable multiway valves are provided at the inlet and at the outlet of the cooling body. Moreover, the expansion member 8 for operating the cooling body as an evaporator is integrated in the inlet-side valve arrangement 11. The throttle valve 9 for operating the cooling body in the coolant circuit having the circulating pump 6 is integrated into the outlet-side valve arrangement 12.

Figure 4:
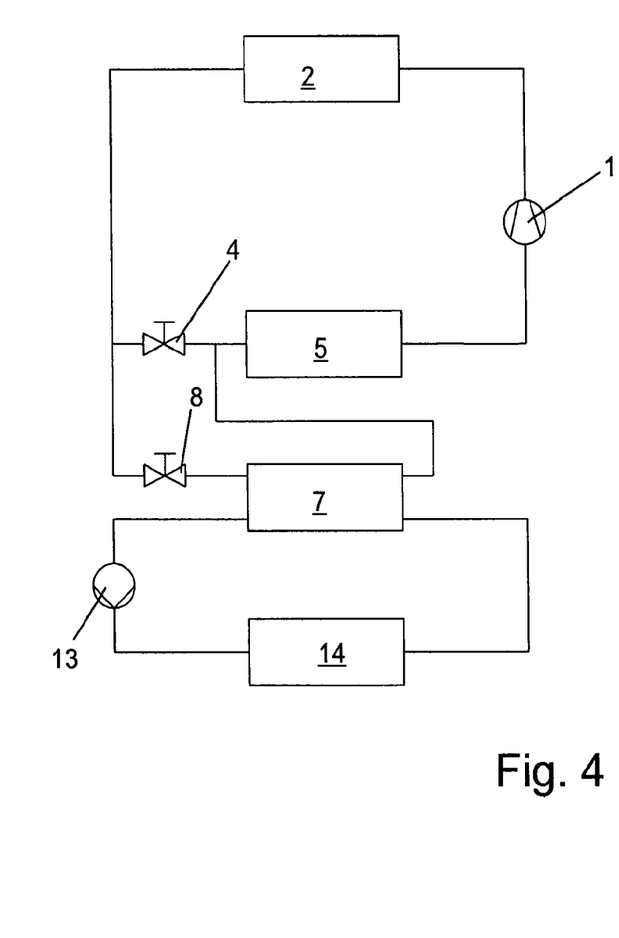
FIG. 4 shows a diagrammatic illustration of a second exemplary embodiment of the invention.

FIG. 4 shows a second exemplary embodiment of the invention. Here, as in the example according to FIG. 1, the cooling body 7 may have two flow paths flowing through it in separate conduits or ducts. The first flow path in this case corresponds to the throughflow of a refrigerant from the refrigerating circuit of the vehicle air conditioning system, as in the second operating mode of the first exemplary embodiment according to FIG. 1.

In contrast to the example according to FIG. 1, however, a circulation of the refrigerant, alternative to compression, in a switchable flow path is not provided, but, instead, a cooling circuit which is materially separate from the refrigerating circuit and has a circulating pump 13 and a low-temperature cooler 14. The cooler 14 is conventionally arranged in the vehicle front region and can be subjected to a throughflow of relative wind.

The fluid of the cooling circuit is usually a liquid, such as a water/glycol mixture. A phase transformation of the coolant within the cooling circuit is not provided, but is basically possible.

In this exemplary embodiment, the driving battery or its cooling body 7 may be cooled either only by means of the refrigerating circuit or only by means of the cooling circuit (for example, with the compressor 1 switched off) or else by means of both circuits. As a result, an especially good adaption to the ambient conditions and the thermal load situation of the heat source is possible. The refrigerant flowing to the cooling body and the coolant flowing to the cooling body constitute two different fluid streams in the context of the invention.

Figure 5:
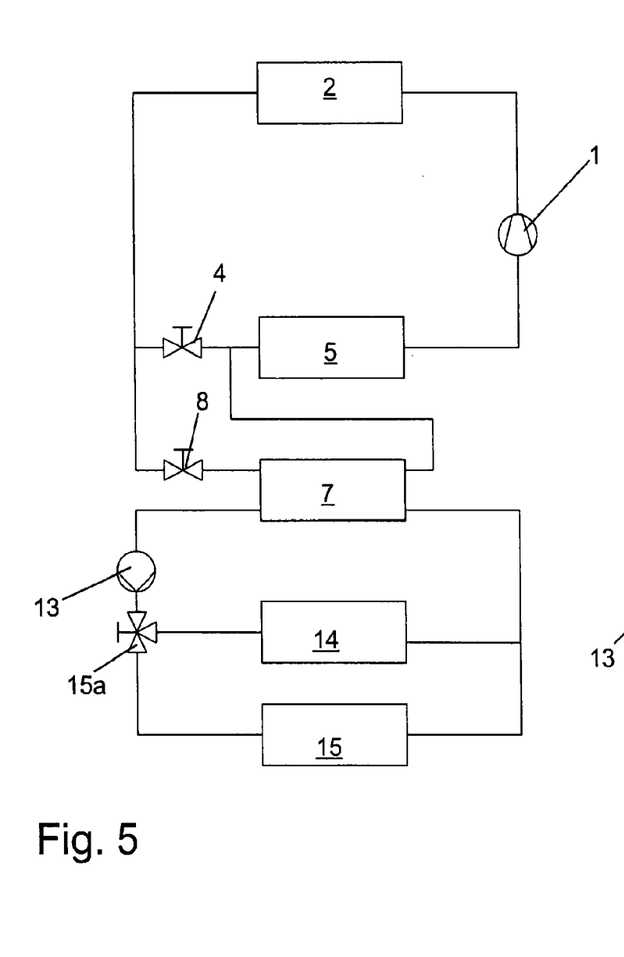
FIG. 5 shows a first modification of the exemplary embodiment from FIG. 4.

In a first modification of the second exemplary embodiment, according to FIG. 5 a heating means 15, for example an electrical heater, is provided in the cooling circuit, in order, when required, to allow a rapid heating of the battery to an operating temperature. In order to transfer as little heat as possible outward in such a warm-up operating mode, for example during a cold start, the electrical heating means 15 is arranged in a branch or bypass which is parallel to the cooler 14 and which can be selected via a multiway valve 15*a*.

Figure 6:
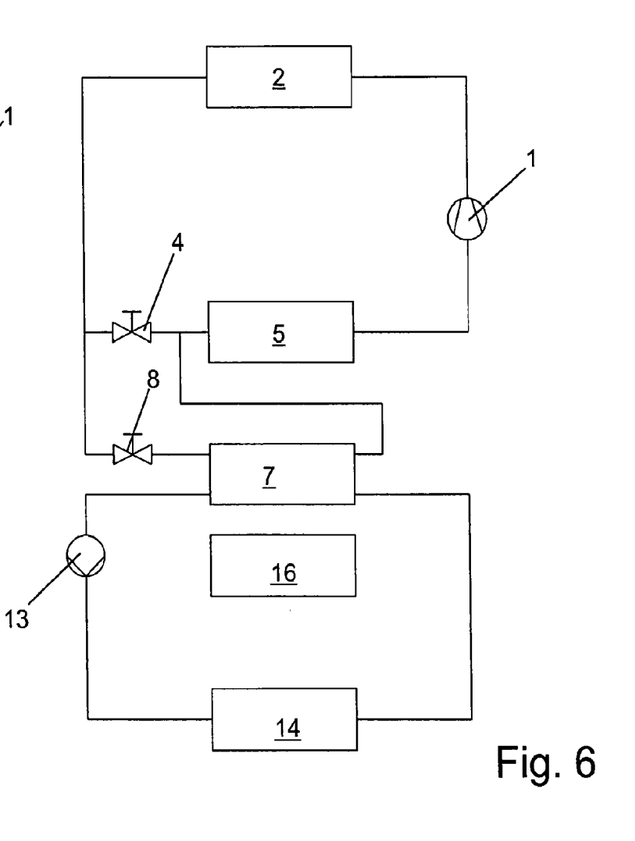
FIG. 6 shows a second modification of the exemplary embodiment from FIG. 4.

In the second modification of the example from FIG. 4 according to FIG. 6, a heating means 16 is likewise provided for the same purpose. However, the heating means 16 is not integrated into the cooling circuit, but, instead, is arranged in the form of an electrical heater, preferably a PTC heater (PTC=positive temperature coefficient), directly on the cooling body 7. Heating may in this case take place by direct heat conduction or else by a flow of hot air by means of a blower.

Figure 7:
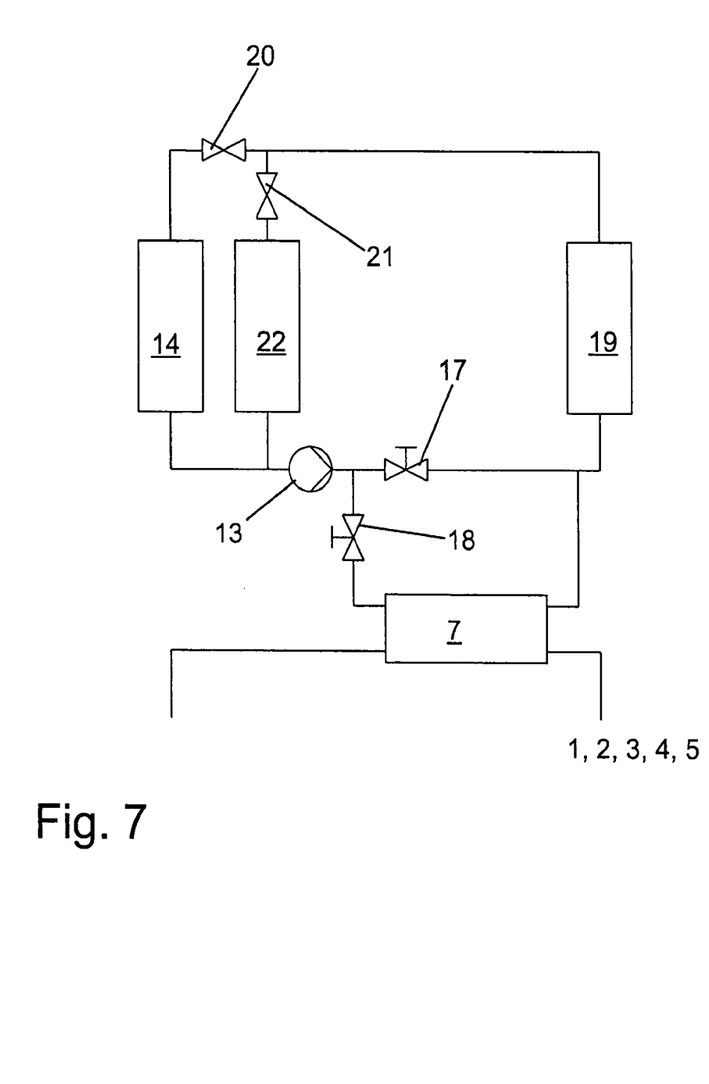
FIG. 7 shows a third modification of the exemplary embodiment from FIG. 4.

In the third modification of the second exemplary embodiment according to FIG. 7, the cooling body 7 is arranged in an optional branch of the cooling circuit, said branch being activatable by means of switching valves. The cooling circuit comprises at least one further assembly 19 to be cooled. In order to ensure a sufficient cooling of the driving battery, in the present case the optional branch of the cooling body 7 is arranged upstream of the assembly 19.

Parallel to the low-temperature cooler 14, a heat exchanger 22 is provided, through which the flow can pass via switching valves 20, 21 and via which waste heat from a vehicle brake can be introduced into the cooling circuit. The heating of the heat source to operating temperature (cold start) can thereby be achieved without the consumption of electrical energy. Such a solution for battery heating is useful especially in the case of a straightforward electric vehicle. The heat exchanger 22 may also, in principle, be connected to other heat sources, for example to the exhaust gas from an internal combustion engine of a hybrid vehicle.

Figure 7A:
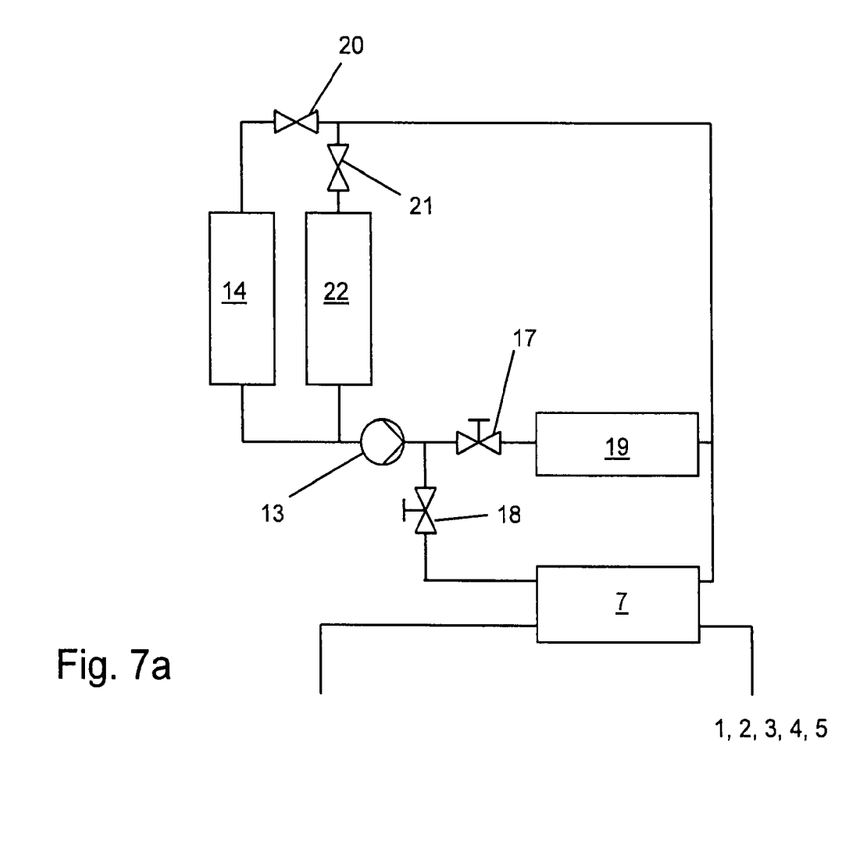
FIG. 7a shows a modification of the exemplary embodiment from FIG. 7.

In a modification of the exemplary embodiment according to FIG. 7, in FIG. 7*a* the assembly 19 is arranged directly downstream of the valve 17. A partial mass stream thus flows through the assembly 19 and a partial mass stream flows through the cooling body 7. What is achieved by an embodiment of this type is that the partial mass stream flowing through the assembly 19 is at a lower temperature level than in the embodiment according to FIG. 7, since no intermixing of the partial mass streams takes place prior to entry into the assembly 19.

Figure 7B:
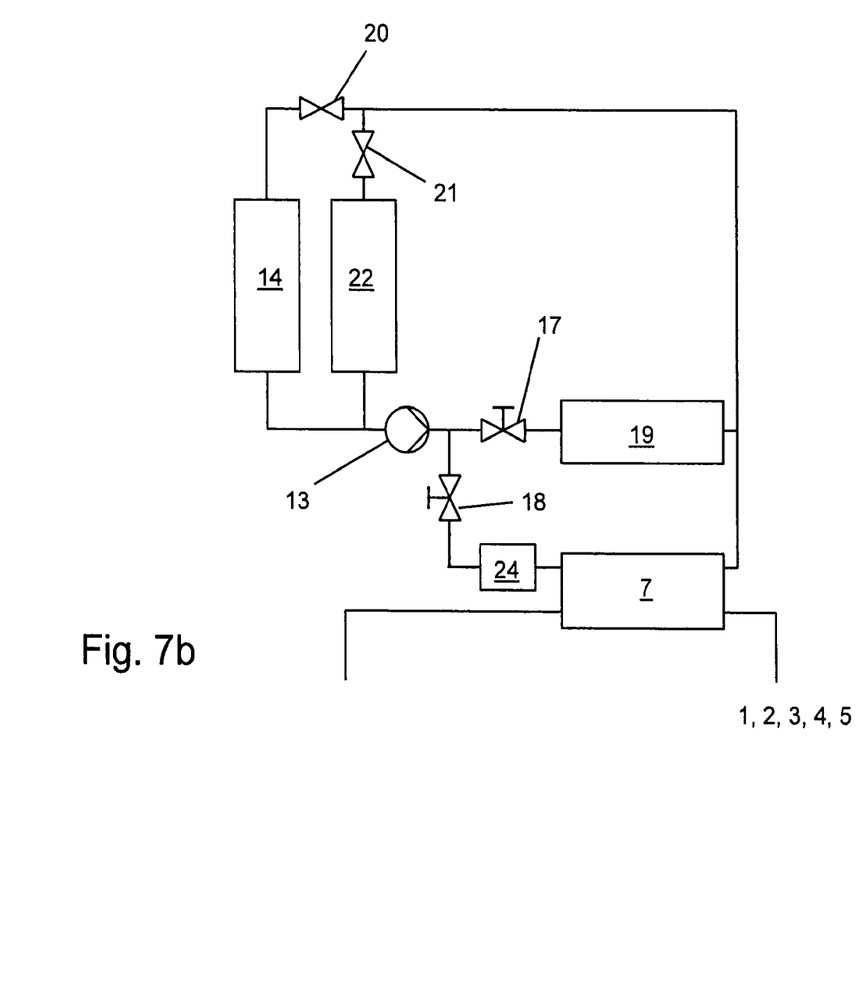
FIG. 7b shows a further modification of the exemplary embodiment from FIG. 7.

In a further modification according to FIG. 7b, a heating body 24 of the air conditioning apparatus may be arranged upstream of the cooling body 7. The cab air is consequently heated via this partial mass stream, and the partial mass stream is cooled in return. This cooling has a positive effect on the performance of the cooling body 7. In an exemplary embodiment, not shown, the heating body 24 may also be arranged downstream of the cooling body 7.

Figure 8:
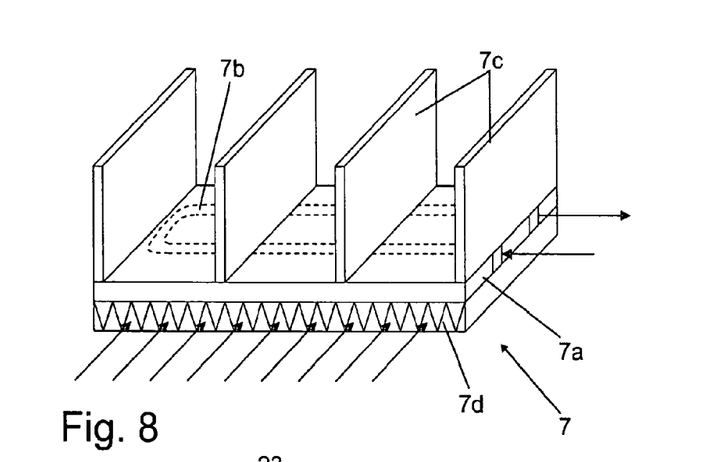
FIG. 8 shows a diagrammatic three-dimensional view of a cooling body of a third exemplary embodiment of the invention.
Figure 9:
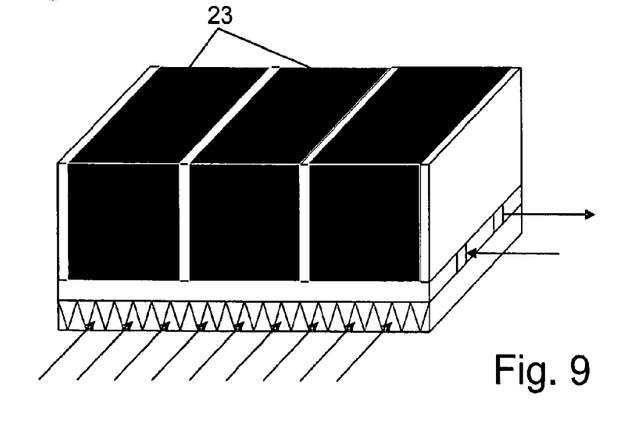
FIG. 9 shows the cooling body from FIG. 8 with electrical accumulator cells inserted.
Figure 10:
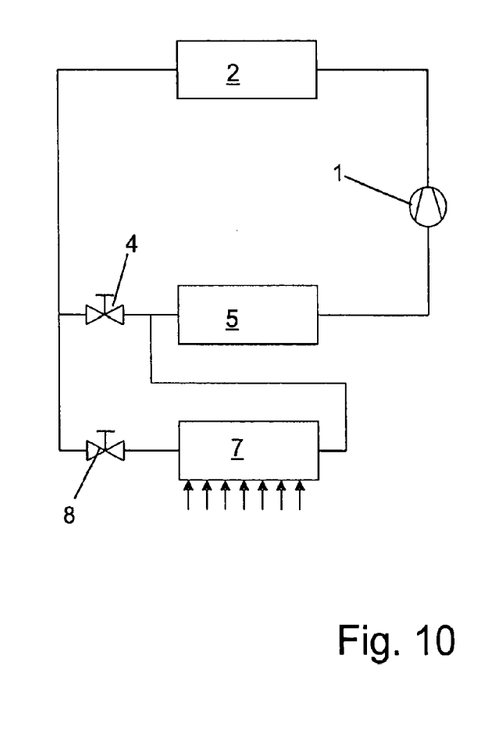
FIG. 10 shows a diagrammatic illustration of the third exemplary embodiment of the invention with the cooling body from FIG. 8.
Figures 11, 12:
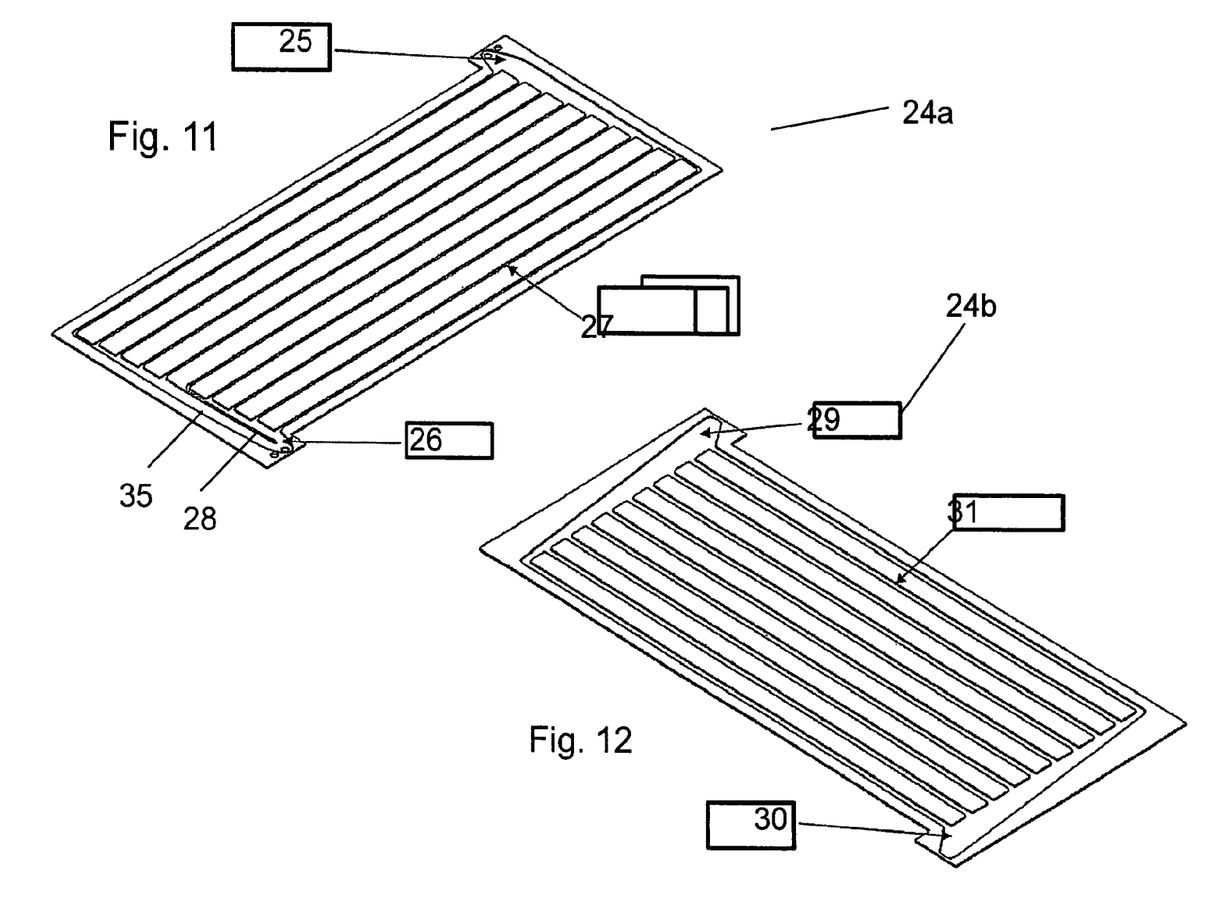
Figure 13:
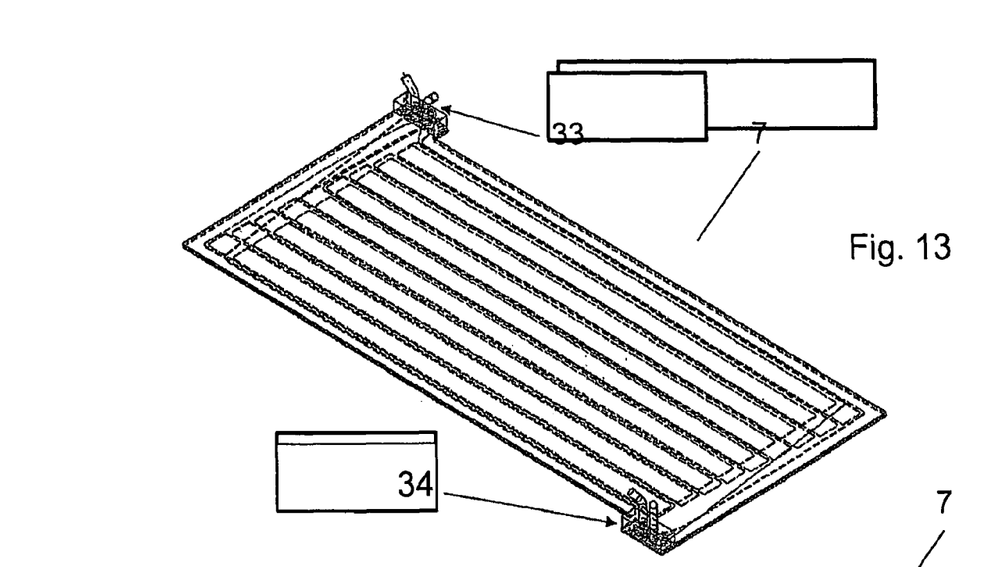
Figure 14:
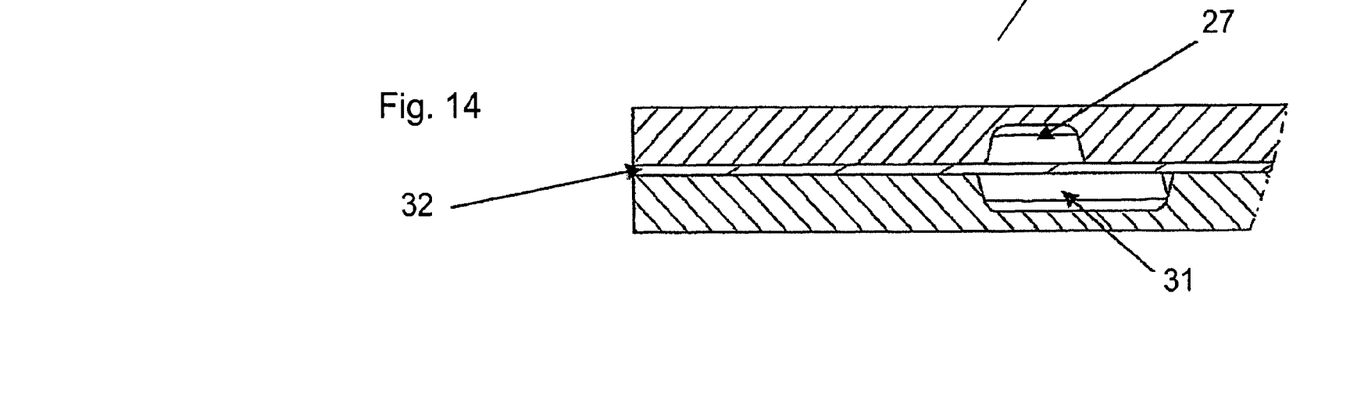

FIG. 8 to FIG. 10 show a third exemplary embodiment of the invention, in which a first fluid stream for flowing through the cooling body is present in the form of a refrigerant as the first fluid. A second fluid stream is formed by flowing cooling air as the second fluid.

Only the cooling body 7, into which, moreover, in FIG. 9, diagrammatically illustrated lithium ion batteries are inserted, is illustrated.

The cooling body 7 consists essentially of a plate-shaped body 7a in which at least one duct 7b for the throughflow of a fluid is formed. The fluid is in the present case a refrigerant of a refrigerating circuit, such as, for example, of the vehicle air conditioning system. The cooling body 7 is expediently designed, for this purpose, as an evaporator of the refrigerating circuit. However, the cooling body 7 may also be connected to a cooling circuit having a circulating pump. Reference is made overall, in this respect, to the exemplary embodiments described above.

Provided on a battery side of the plate 7a are heat-conducting cooling ribs 7c which are arranged between the individual battery cells 23 in order to conduct their heat as optimally and as uniformly as possible to the body 7a.

On the other side of the plate-shaped body 7a, cooling ribs 7d capable of being subjected to an air flow are provided, so that air can flow as effectively as possible onto the cooling body. The cooling air is preferably ambient air from outside the vehicle. This may be supplied, for example, by means of a blower and an air duct. In this case, the ambient air will usually be especially cool when the air conditioning system of the vehicle is not activated.

To ensure that heat is transported away effectively via the air, a high heat conductivity of the cooling ribs 7d and a thin-walled cooling plate 7a are advantageous. A high air throughput with a high heat transfer coefficient is likewise advantageous.

It would be appreciated that the individual features of the exemplary embodiments may expediently be combined with one another. In particular, the air flow according to the third exemplary embodiment can also be combined with each of the cooling bodies 7 of the two exemplary embodiments described above. There would thereby then in each case be three fluid streams for the selectable alternative or cumulative cooling flow upon the cooling body.

In the present embodiments, the refrigerant circuit was designed so that it can be operated with a refrigerant, such as, for example, R134a, condensing on the high-pressure side. It will be appreciated that, if the refrigerant R744 is used, corresponding variations are required such as, for example, the replacement of the condenser by a gas cooler, the placing of the collector on the low-pressure side and, if appropriate, the addition of an internal heat exchanger. Such changes or variations of the refrigerant circuit are sufficiently known to a person skilled in the art from the prior art.

FIGS. 11 to 14 show an exemplary embodiment of a cooling body 7, such as is used particularly in the exemplary embodiments according to FIG. 4 to FIG. 7. In these exemplary embodiments, a refrigerant and a coolant flowing in a separate cooling circuit flow through the cooling body 7.

The cooling body consists of two duct plates 24a for the refrigerant and 24b for the coolant, each duct plate having a multiplicity of ducts 27 for the refrigerant and ducts 31 for the coolant.

The two duct plates are separated from one another by a sheet 32 (see FIG. 14) solder-plated on both sides, so that separate flow paths 27 and 31 for the refrigerant and for the coolant are obtained.

In order to achieve as compact a cooling body 7 as possible which saves as much construction space as possible, the inflows 26 and 29 and outflows 25 and 30 for the refrigerant and for the coolant are combined in connection blocks 33 and 34.

In an alternative, not illustrated, it is possible, furthermore, to provide the ducts 27 and 31 with ribs or turbulence inserts, in order to enlarge the heat-transmitting surface.

In order to ensure an equal distribution of the refrigerant particularly on the refrigerant side of the cooling body 7, the inflow-side collecting duct 35 is provided with a solid rib 28. The cross section in the collecting duct 35 is selected so that a slightly accelerated flow prevails. For this purpose, the collecting duct tapers in cross section, upstream, correspondingly to the outlets into the ducts 27 of the refrigerant-carrying duct plate 24a.

As a result of intensive measurements, a mass flow density of $>80$ kg/m$^2$s has proved to be beneficial in order to achieve a constant heat transfer coefficient.

Such a configuration of the cooling body 7 results in a series of advantages:
Construction space optimization, since the two duct plates can be manufactured in one block.
An independent configuration of the duct geometries and their connections for each plate, since there is no risk of overlapping.

The invention claimed is:

1. A device for cooling a heat source of a motor vehicle, comprising a cooling body (7) which is in thermal contact with the heat source, a first fluid stream for the discharge of heat being capable of flowing to the cooling body (7), wherein at least one second fluid stream for the discharge of heat can flow selectably to the cooling body (7), wherein the heat source is an electrical energy accumulator, the first fluid stream being driven by a compressor (1) of a refrigerating circuit and the second fluid stream being driven by a circulating pump (6), wherein the device is operable in a first mode wherein the compressor (1) is off and the at least one second fluid stream flows along a flow path defined by the circulating pump (6), a condenser (2) and the cooling body (7) so that the at least one second fluid stream receives heat from the heat source, and a second mode wherein the compressor (1) is on and the first fluid stream flows along a flow path defined by the compressor (1), an evaporator (5), the cooling body (7), and the condenser (2) so that the first fluid stream receives heat from the heat source.

2. The device as claimed in claim 1, wherein the fluid of the first fluid stream is identical to the fluid of the second fluid stream.

3. The device as claimed in claim 2, wherein the fluid is a refrigerant, the first fluid stream being driven by the compressor (1) of a refrigerating circuit and the second fluid stream being driven by the circulating pump (6).

4. The device as claimed in claim 3 wherein the second fluid stream flows through a valve (9) following the cooling body (7).

5. The device as claimed in claim 3, wherein a first duct for the first fluid stream and a second duct for the second fluid stream are formed in the cooling body (7).

6. The device as claimed in claim 3, wherein the two fluid streams flow through the same duct in the cooling body.

7. The device as claimed in claim 6, wherein the selection of the fluid stream takes place via at least one switchable valve (11, 12).

8. The device as claimed in claim 3, wherein at least one of the fluid streams can flow to an electrical heating element (10) for the selectable heating of the heat source.

9. The device as claimed in claim 3, wherein the refrigerating circuit is a refrigerating circuit of an air conditioning system.

10. The device as claimed in claim 1, wherein a fluid of the first fluid stream is a refrigerant of the refrigerating circuit, and wherein the fluid of the second fluid stream is a coolant, separate from the first fluid, of a coolant circuit.

11. The device as claimed in claim 10, wherein the coolant circuit comprises the circulating pump (13) and a cooler (14) for the discharge of heat from the fluid.

12. The device as claimed in claim 10, wherein the coolant circuit has a heat exchanger (15, 22) for the selectable heating of the coolant.

13. The device as claimed in claim 12, wherein the heat exchanger (22) transmits heat from a braking action of the vehicle to the fluid.

14. The device as claimed in claim 10, wherein a further heat source (19) can be cooled by means of the refrigerant circuit or the coolant circuit.

15. The device as claimed in claim 10, wherein the cooling body (7) can be separated selectably from the coolant circuit by means of a valve (17, 18).

16. The device as claimed in claim 1, wherein an electrical heating element (16) for the selectable heating of the heat source is arranged in the cooling body.

17. The device as claimed in claim 1, wherein a fluid of the first fluid stream is a refrigerant of a refrigerating circuit, and wherein a throttle element is provided, downstream of the cooling body (7), in the refrigerating circuit.

18. The device as claimed in claim 1, wherein a fluid of the first fluid stream is a refrigerant of a refrigerating circuit wherein a clock valve, is provided, upstream of the cooling body (7), in the refrigerating circuit, so that a clocked supply of refrigerant into the cooling body (7) becomes possible.

19. The device as claimed in claim 1, wherein the electrical energy accumulator is a lithium ion battery (23).

* * * * *